US012576997B2

(12) United States Patent
Richmond et al.

(10) Patent No.: US 12,576,997 B2
(45) Date of Patent: Mar. 17, 2026

(54) DRONE ARM FOLDING/LOCKING MECHANISM

(71) Applicant: Inspired Flight Technologies, Inc., San Luis Obispo, CA (US)

(72) Inventors: Beckham S. Richmond, San Luis Obispo, CA (US); Nathan Ben Erlin, Los Osos, CA (US); Marcus R. Stollmeyer, Atascadero, CA (US); Alexander James Scheck, San Luis Obispo, CA (US)

(73) Assignee: Inspired Flight Technologies, Inc., San Luis Obispo, CA (US)

( * ) Notice: Subject to any disclaimer, the term of this patent is extended or adjusted under 35 U.S.C. 154(b) by 39 days.

(21) Appl. No.: 18/680,242

(22) Filed: May 31, 2024

(65) Prior Publication Data

US 2025/0368362 A1     Dec. 4, 2025

(51) Int. Cl.
*B64U 30/293* (2023.01)

(52) U.S. Cl.
CPC .................................. *B64U 30/293* (2023.01)

(58) Field of Classification Search
CPC ...................................................... B64U 30/293
USPC .......................................................... 292/1
See application file for complete search history.

(56) References Cited

U.S. PATENT DOCUMENTS 4,736,490 A * 4/1988 Wesselski ............... F16C 11/10
                                                        16/349
5,906,452 A * 5/1999 Lee ...................... B62K 15/006
                                                        403/325

2015/0259066 A1* 9/2015 Johannesson .......... B64U 20/50
                                                        244/17.27
2017/0043870 A1* 2/2017 Wu ...................... B64U 30/291
2017/0291677 A1* 10/2017 Harris .................... B64U 10/13
2020/0031467 A1* 1/2020 Liu ........................ B64U 10/13
2020/0307755 A1* 10/2020 Zhang .................. B64U 30/293
2020/0324874 A1* 10/2020 Zhang .................... B64C 27/50

(Continued)

FOREIGN PATENT DOCUMENTS

CN          204223178 U      3/2015
CN          103979107 B      1/2016

(Continued)

OTHER PUBLICATIONS

"Folding Arm Rotary Lock Foldable Clamp Connector for UAV Drone", https://www.aliexpress.us/item/2255800120416071.html, (May 7, 2024).

*Primary Examiner* — Nathan Cumar
(74) *Attorney, Agent, or Firm* — Schwegman Lundberg & Woessner, P.A.

(57) ABSTRACT

A drone includes arms rotatable between an extended position and a retracted position. Coupling mechanisms are operable to retain the arms in their extended position. The coupling mechanisms each include a latch being movable from an engaged position in which the relevant arm is held in its extended position and a release position in which the relevant arm is free to move between its extended position and its retracted position. The latches are biased towards their engaged positions. Each coupling mechanism may include a lock that holds the latch in its release position, the latch being released from the lock by rotation of the first arm into its extended position. Release of the latch engages a cam on the relevant arm to hold it in its extended position.

10 Claims, 11 Drawing Sheets

(56)                References Cited

U.S. PATENT DOCUMENTS

| | | | | |
|---|---|---|---|---|
| 2021/0214067 A1* | 7/2021 | West | ................... | B64U 30/293 |
| 2022/0219830 A1* | 7/2022 | Zhang | ................... | B64D 31/06 |
| 2022/0234673 A1* | 7/2022 | Wang | .................. | B62K 15/006 |
| 2022/0340259 A1* | 10/2022 | Yoon | ....................... | B64C 11/28 |
| 2022/0388652 A1* | 12/2022 | Hefner | .................. | B64U 10/25 |
| 2022/0411047 A1* | 12/2022 | Mihai | ................... | B64C 25/20 |
| 2023/0091659 A1* | 3/2023 | Kendall | ................ | B64U 50/31 |
| | | | | 701/11 |
| 2023/0106432 A1* | 4/2023 | Baumgartner | ......... | G05D 1/221 |
| | | | | 701/2 |

FOREIGN PATENT DOCUMENTS

| | | | | | |
|---|---|---|---|---|---|
| CN | 206031748 U | 3/2017 | | | |
| CN | 206485559 U | 9/2017 | | | |
| CN | 207120871 U | 3/2018 | | | |
| CN | 108128441 A | 6/2018 | | | |
| CN | 208828084 U | 5/2019 | | | |
| CN | 211766249 U | 10/2020 | | | |
| CN | 212125499 U | 12/2020 | | | |
| KR | 101912188 B1 * | 10/2018 | .......... | B64C 39/024 |
| KR | 102539222 B1 | 6/2023 | | | |
| WO | WOO-2021243502 A1 | 12/2021 | | | |

* cited by examiner

DRONE ARM FOLDING/LOCKING MECHANISM

FIELD OF THE INVENTION

The technology relates to the general field of small uncrewed aircraft (hereinafter referred to as "drones"). A drone is a remotely or autonomously piloted aerial vehicle, usually propelled by means of electrically-driven rotors.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. Referring now to the drawings, in which.

DETAILED DESCRIPTION

Drones have many applications, in broad categories such as surveillance and assessment, aerial inspection and repair, logistics, rescue and package delivery. There is growing adoption of drones by various government and commercial industries, including military & defense, agricultural services, firefighting, first responders, public safety, logistics & transportation, healthcare, construction & mining, utilities, renewable energy, and telecommunications.

Drones may use a combination of rotors and fixed wings to provide lift in a manner similar to traditional aircraft. In most cases the rotors are propelled by brushless direct current (BLDC) electrical motors that are controlled by electronic speed controllers (ESCs). BLDC motors are powered either by onboard batteries, electricity generating fuel-cells, or tethered cables connected to a land-based power source.

Possible drone configurations that will benefit from the examples disclosed herein include small vertical takeoff and landing (VTOL) remotely or autonomously-piloted aircraft, which usually employ three to five electric motors; quad-copters, which have four electric motors; hexacopters, which have six electric motors; and octocopters, which have eight electric motors.

Figure 1:
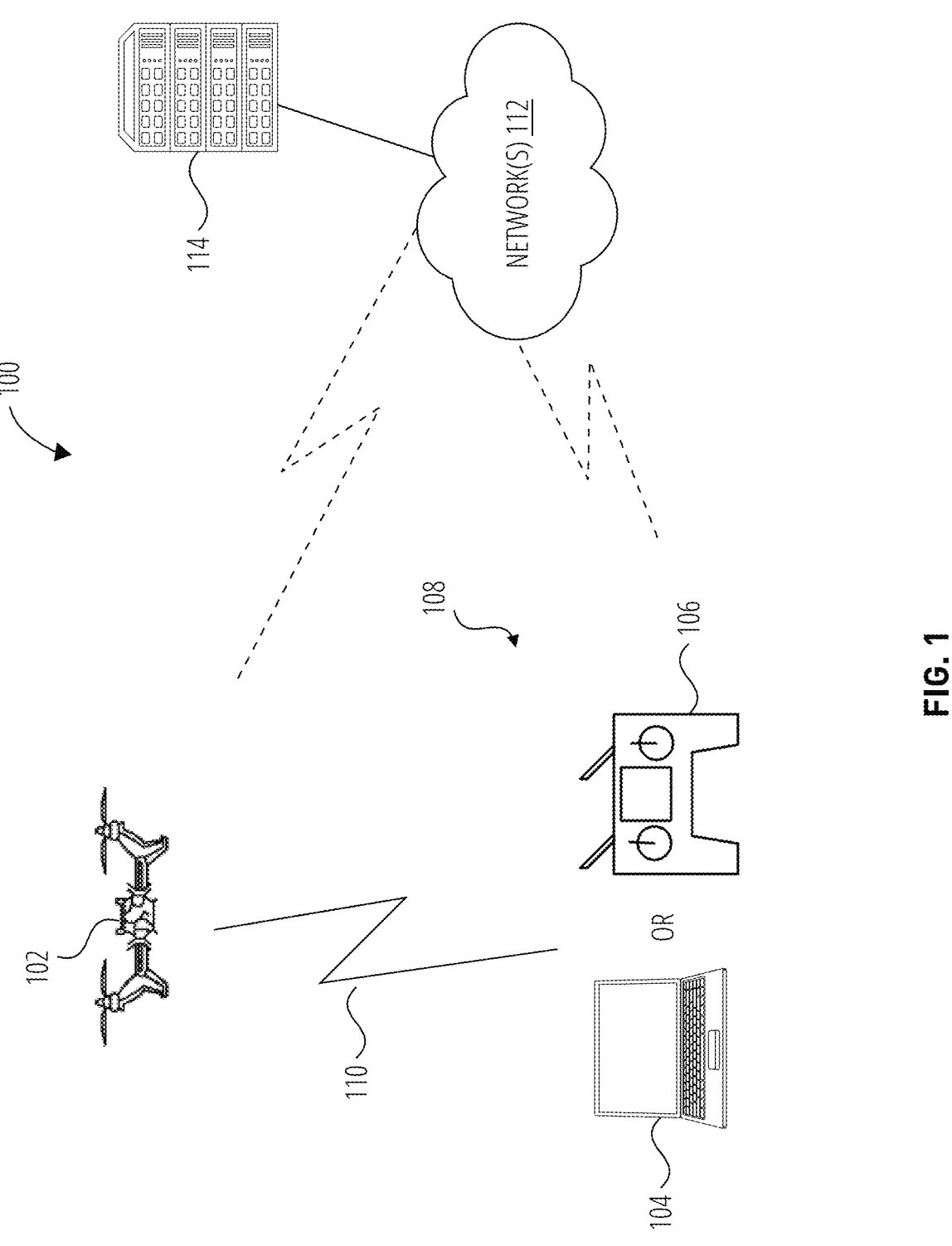
FIG. 1 illustrates a high-level view of a Small Uncrewed Aircraft System (SUAS), according to some examples.

FIG. 1 illustrates a high-level view of a small uncrewed aerial system (SUAS), according to some examples. The SUAS 100 consists of a commercial grade drone 102 with an onboard flight control computer running flight control software. In some examples the drone 102 is flown by a licensed ground-based pilot, utilizing a handheld controller 106 or laptop computer 104 running ground control software. The laptop computer 104/handheld controller 106 thus operates as a ground control station 108, which communicates with the drone 102 via local radio frequency (RF) wireless transmissions 110. Additional data or commands may be exchanged between the ground control station 108, the drone 102, and one or more remote servers 114 over network(s) 112.

An important aspect of drone utilization is the compact transportation of the drone to the flight location, and ease of assembly and disassembly (or "folding" and "unfolding") at the flight location. Assembly and disassembly should not only be convenient, but should also provide safe, deliberate and secure engagement of any locking mechanisms.

Most multi-rotor small drones have hinged arms, with shoulder locking mechanisms that enable portability and storage. Drone motors/propellers induce substantial and variable thrust and torque on the arms during flight. Existing locking mechanisms require pilot care to ensure full arm extension and lock engagement preflight. If the drone arms are not fully extended prior to locking, the motor thrust of the drone will be out of balance, degrading the drone's stability and performance. As arm locking mechanisms wear from repeated use they may be inclined to loosen and unfasten more easily. If an arm lock disengages in flight, the resulting wild arm movement t will cause the drone to lose control and could result in a drone crash. As commercial adoption of drones intensifies, and autonomous flights beyond visual line of sight (BVLOS) become more common, the problem of drone arm wear and the associated partial engagement and locking will become more significant.

Figure 2:
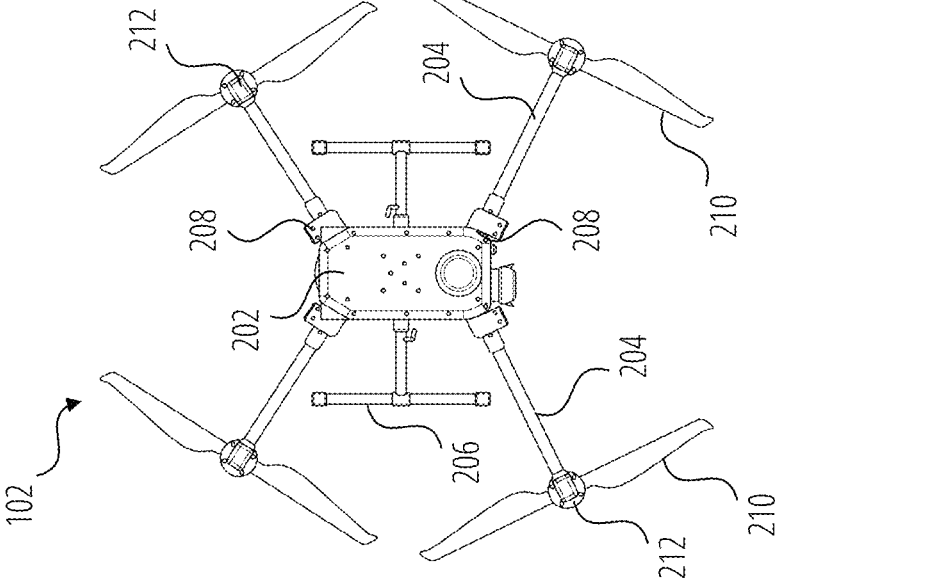
FIG. 2 is a top view of a drone in an operational configuration, according to some examples.

FIG. 2 is a top view of a drone 102 in an operational configuration, according to some examples. The drone includes a body 202, arms 204 extending from the body 202, landing gear 206, propellers 210, and motors 212 for driving the propellers 210.

The motors 212 provide the necessary torque to the propellers 210 to lift and maneuver the drone 102. The motors 212 and propellers 210 come in clockwise and counterclockwise pairs to balance the torque and provide stable flight. The size and pitch of the propellers affect the drone's lift and efficiency.

Various components of the drone 102 are housed in the body 202, including electronic speed controllers, a flight controller, one or more batteries, a power distribution board, a radio receiver and transmitter, a GPS module, various sensors, and a communication module that enables data transmission between the drone and ground station for telemetry, video feed, and control signals. In most cases, the drone 102 includes a camera and, optionally, a gimbal for camera stabilization.

Figure 3:
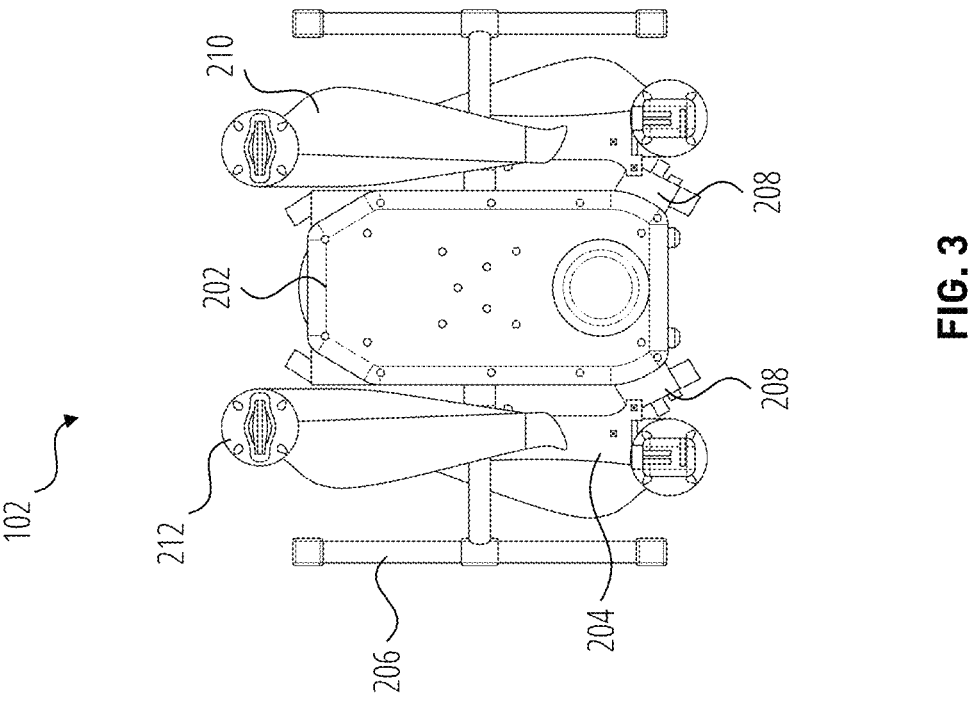
FIG. 3 is a top view of a drone in a storage and transport configuration, according to some examples.

The arms 204 are coupled to the body 202 by means of couplers 208 that permit the arms 204 (and thus the propellers 210, which may themselves be foldable) to rotate between extended positions shown in FIG. 2 and retracted positions shown in FIG. 3.

FIG. 3 is a top view of a drone 102 in a storage and transport configuration, according to some examples. As can be seen, the arms 204 have been rotated to positions adjacent to the body 202, and in this instance the propellers 210 have been folded as well.

Figure 4:
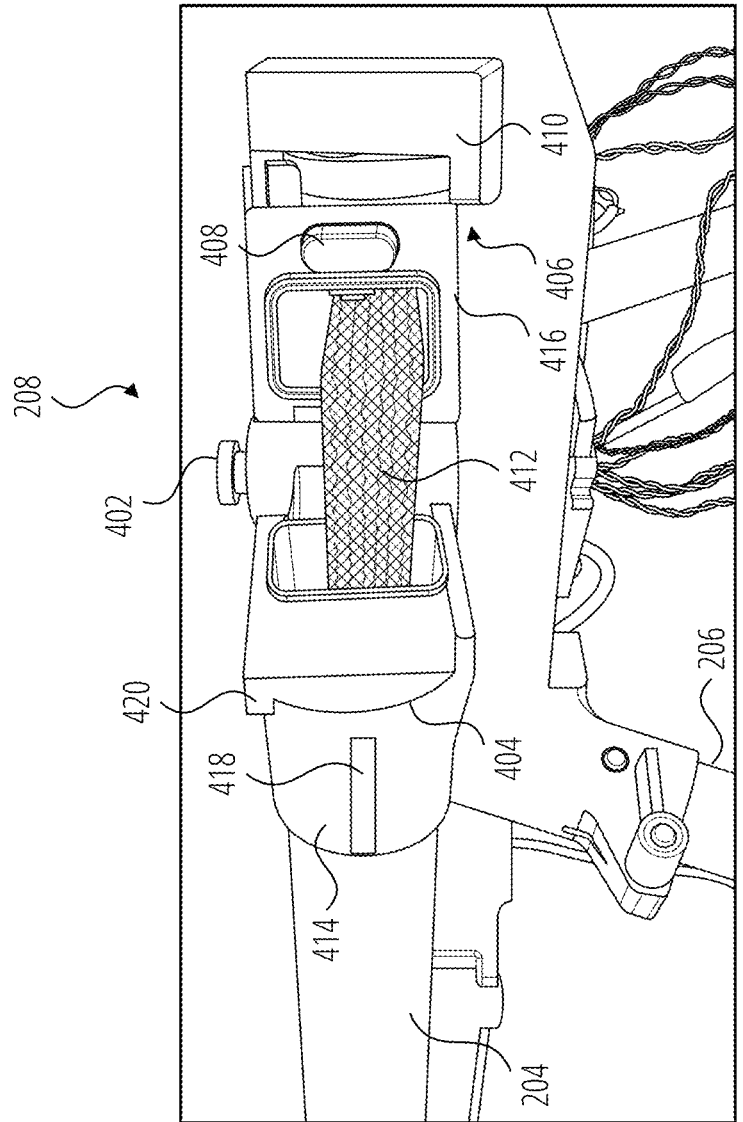
FIG. 4 is a side view of part of the drone to illustrate the coupler in an open configuration in which an arm is folded/retracted, according to some examples.

FIG. 4 is a side view of part of the drone 102 to illustrate the coupler 208 in an open configuration in which an arm 204 is folded/retracted, according to some examples. As can be seen, the arm 204 is pivotably joined to the body 202 by means of a shaft 402 that forms part of the coupler 208. The arms 204 are hollow to permit cables, enclosed in a cable sheath 412, to transfer power and command signals from the body 202 to the motors 212.

The coupler 208 comprises a movable portion 414 that is configured to receive and hold the end of the arm 204 that is closest to the body 202, and a fixed portion 416 that is attached to the body 202 and that engages the movable portion 414 to hold it (and thus its corresponding arm 204) in the extended position.

The movable portion 414 includes a cam 404 that is engaged by a latch 406 on the fixed portion 416 to hold the arm 204 in the extended position, as will be described in more detail below. The cam 404 includes a stop 420 at the upper end thereof to prevent over-rotation of the latch handle 410. The movable portion 414 also includes an alignment line 418 that, together with alignment lines 502 on a latch handle 410, provides a visual confirmation that the latch 406 is fully closed. Preferably a bright color, such as neon orange or yellow, is used for the alignment lines 418, 502 to make them highly visible.

The fixed portion 416 includes the latch handle 410 that engages the cam 404, and a plunger 408 that is used to release the latch 406 when the arm 204 is fully extended. The latch 406 is spring-loaded, and its release by the plunger 408 will result in at least partial engagement of the latch handle 410 with the cam 404.

Figure 5:
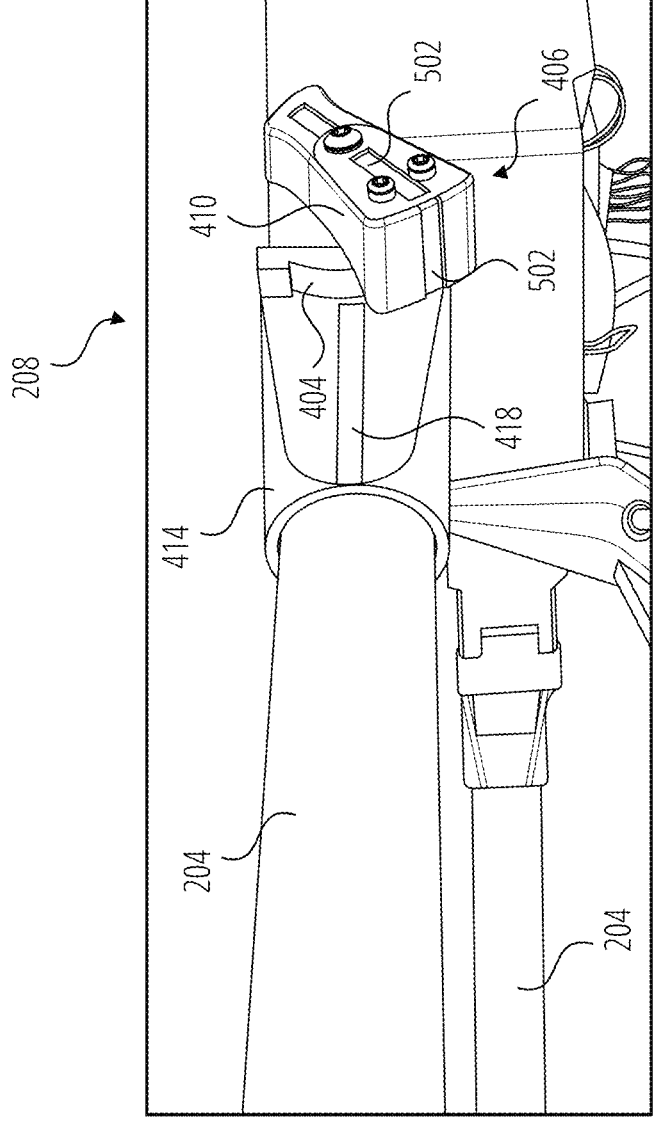
FIG. 5 is a side view, corresponding to FIG. 4, of part of the drone, to illustrate the coupler in a partially closed configuration in which an arm is extended, according to some examples.

FIG. 5 is a side view, corresponding to FIG. 4, of part of the drone 102, to illustrate the coupler 208 in a partially closed configuration in which the arm is extended, according to some examples. In FIG. 5, the arm 204 has been rotated counterclockwise (seen from above) until the movable portion 414 has fully depressed the plunger 408, releasing the spring-loaded latch 406 into engagement with the cam 404. In this partially engaged configuration, the alignment lines 502 on the latch handle 410 are not aligned with the alignment line 418 on the movable portion 414, providing a visual indicator that the latch 406 is not fully engaged.

This partial engagement is sufficient to maintain engagement between the cam 404 and the latch 406. If the pilot fails to rotate the latch handle 410 to full engagement, the drone 102 is still safe for flight, as a partially engaged latch 406 will still prevent arm movement, and, being spring loaded, the latch handle 410 will only increase its engagement with the cam 404 under torque and vibration.

Figure 6:
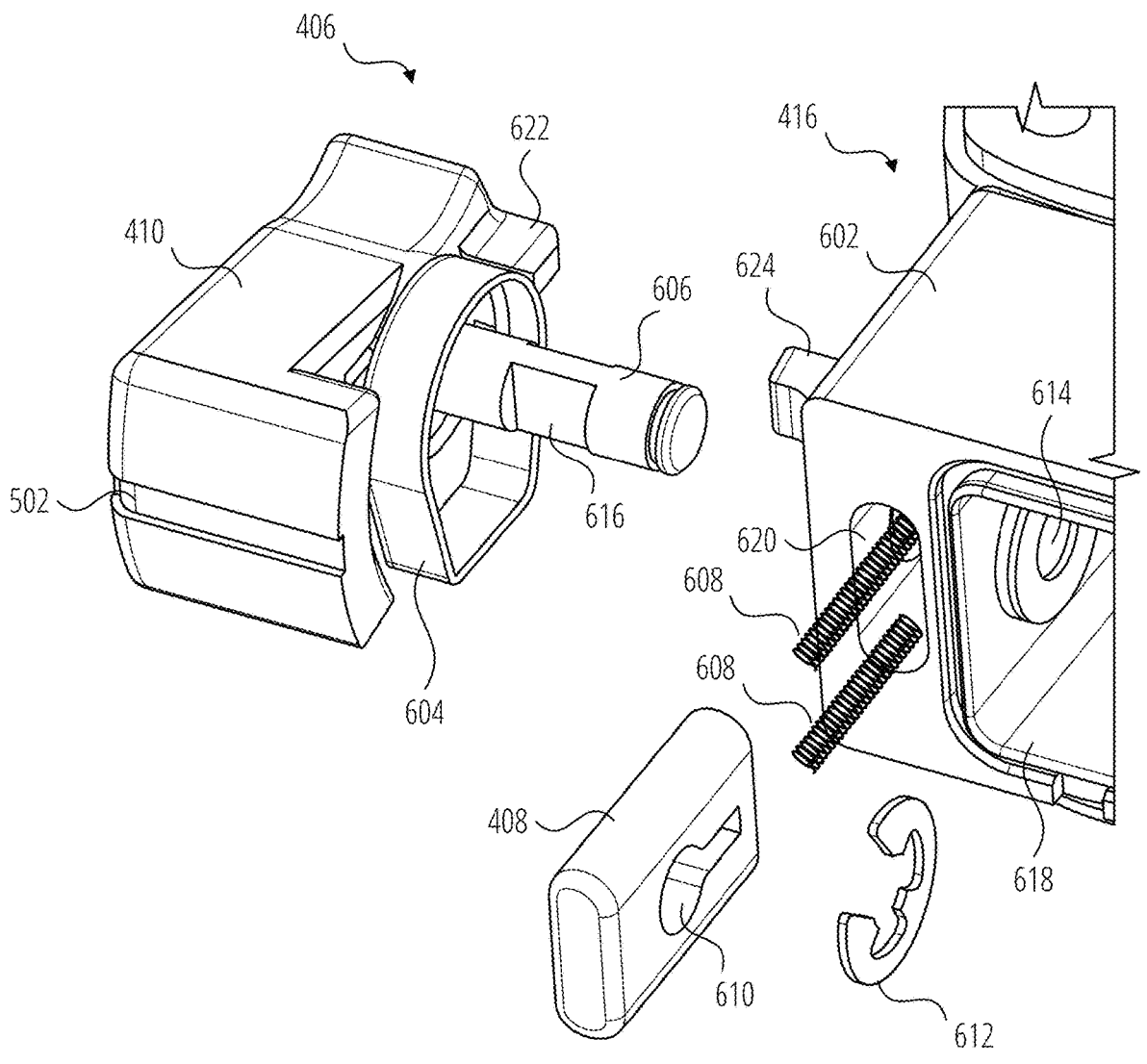
FIG. 6 is an exploded perspective view of the fixed portion of the coupler of the drone, according to some examples.
Figure 7:
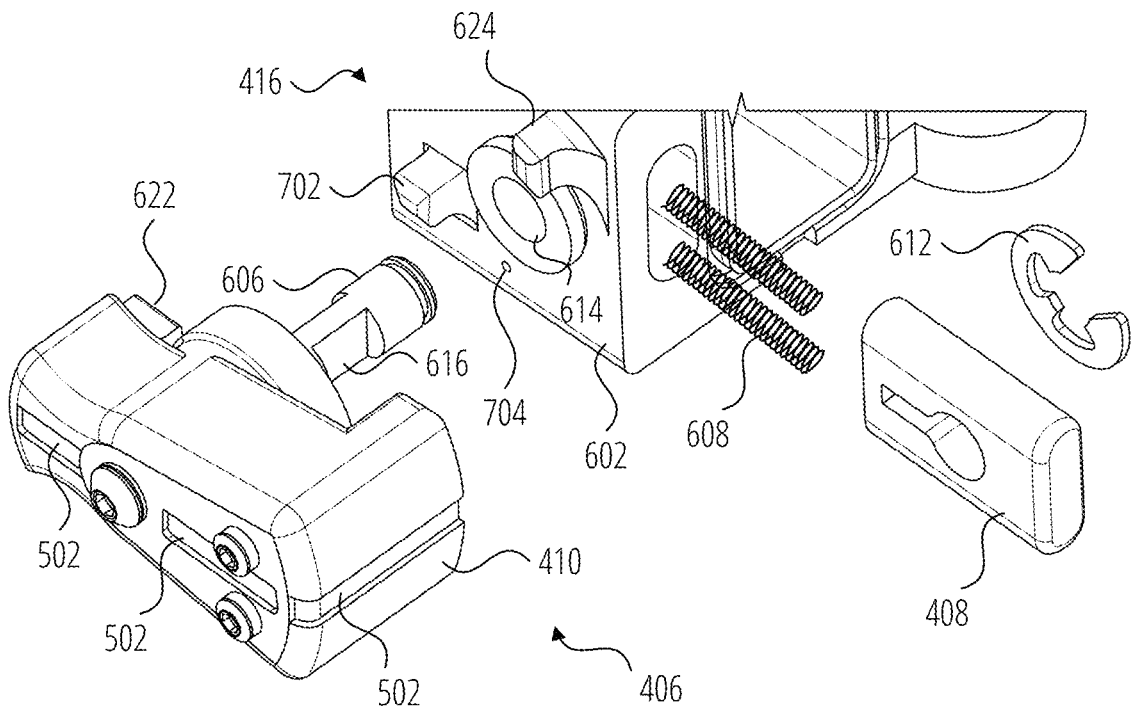
FIG. 7 is a further exploded perspective view of the fixed portion of the coupler of the drone, according to some examples.

FIG. 6 and FIG. 7 are exploded perspective views of the fixed portion 416 of the coupler 208 of the drone 102, according to some examples. As can be seen, the fixed portion 416 of the coupler 208 includes a body 602 that is mounted to the drone 102. The body includes a passageway

618 through which the cables in their cable sheath 412 are routed to the interior of the body 202 of the drone 102. The body 602 also includes a hole 614 passing therethrough, to receive a latch key 606 of the latch 406. The latch key 606 is held in place in the hole 614 by a retaining ring 612.

The plunger 408 includes a keyhole-shaped slot 610 that engages with the latch key 606 in use. A cavity 620 that is shaped and sized to receive the plunger 408 is also provided in the body 602. The cavity 620 intersects with the hole 614 and is sufficiently deep to receive the plunger 408 and two plunger springs 608, such that the slot 610 of the plunger 408 is variably positionable in the hole 614 to engage and release the flat surfaces 616 of the latch key 606 in use as described below.

The latch 406 also includes a cover 604 that provides space between the latch handle 410 and the body 602 within which a torsion spring 802 is housed. The latch handle 410 also includes a stop 622 that is positioned in use between two stops 624, 702 located on the body. Rotation of the latch handle in the hole 614 is thus limited to an arc between the stops 624, 702. The latch 406 is biased toward its closed position by a torsion spring 802, one end of which is received in a hole 704 in the body 602 of the fixed portion 416.

Figure 8:
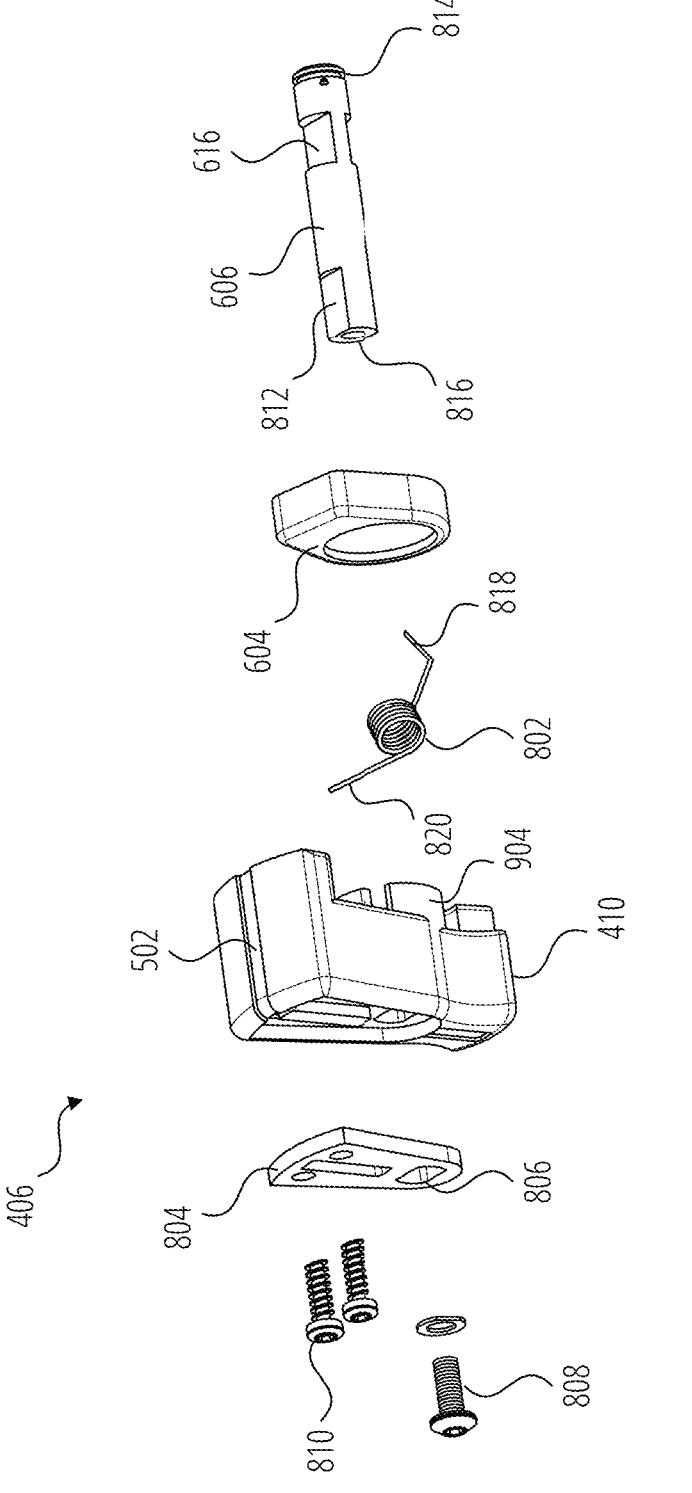
FIG. 8 is an exploded perspective view of the latch of the drone, according to some examples.

FIG. 8 is an exploded perspective view of the latch 406 of the drone 102, according to some examples. The latch 406 includes a latch handle 410, a torsion spring 802, a cover 604, a latch key 606, a spine 804, and fasteners 808, 810.

Figure 10B:
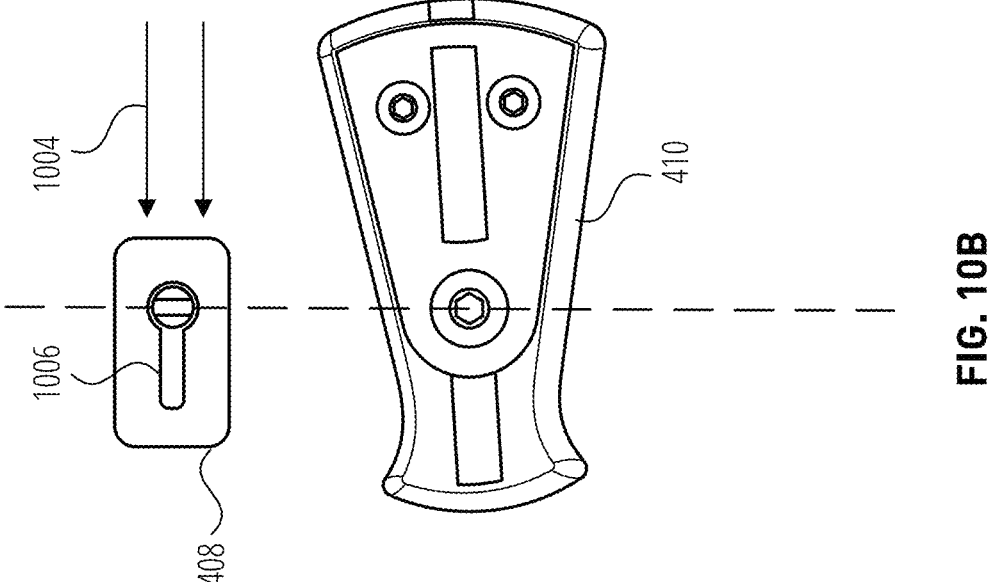
FIG. 10A and FIG. 10B are two side views of the latch and plunger to illustrate the interaction between the latch key and the plunger, in some examples.
Figures 11A, 11B, 11C:
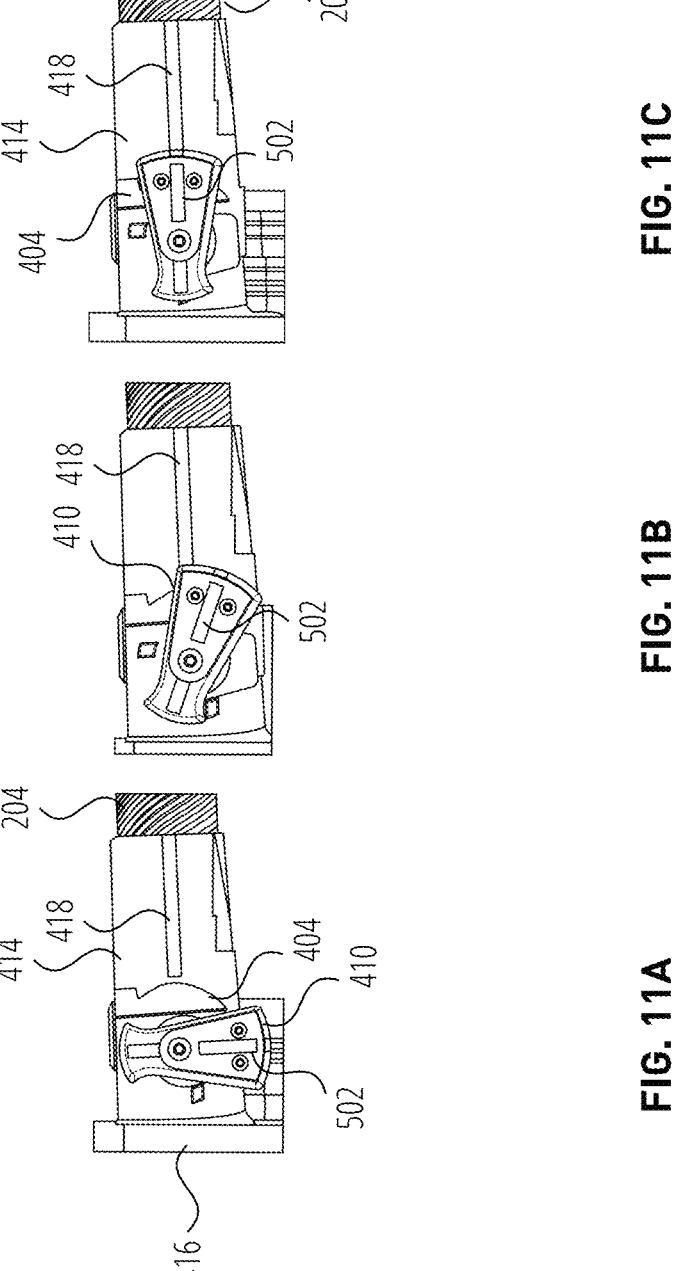
FIG. 11A, FIG. 11B, and FIG. 11C are three side views of latch that illustrate a locking sequence in some examples.

The latch key 606 is generally rod-shaped and includes a groove 814 at one end thereof for engaging the retaining ring 612, and a threaded hole 816 for receiving the fastener 808, which holds it in place in the latch handle 410. The latch handle 410 includes opposed flat surfaces 616 that engage the slot 610 in the plunger 408 as discussed in more detail below. The latch key 606 also includes opposed flat surfaces 812 that engage a slot 806 in the spine 804. The flat surfaces 616 are offset with respect to the flat surfaces 812, so that the latch handle 410 rotates past the center of the cam 404, as can be seen in FIG. 10B and FIG. 11C, to enhance secure engagement of the latch handle 410 with the cam.

The spine 804 fits into a correspondingly shaped recess in the latch handle 410 and is held in place by the fasteners 808 and 810. The fastener 808 also holds the latch key 606 in place in the latch handle 410 by engaging a threaded hole 816 in one end of the latch key 606.

The torsion spring 802 includes a straight end 820 that engages the latch handle 410 and a bent end 818 that is received in the hole 704 thereby to provide a torque that biases the handle towards its locked position relative to the body 602.

Figure 9:
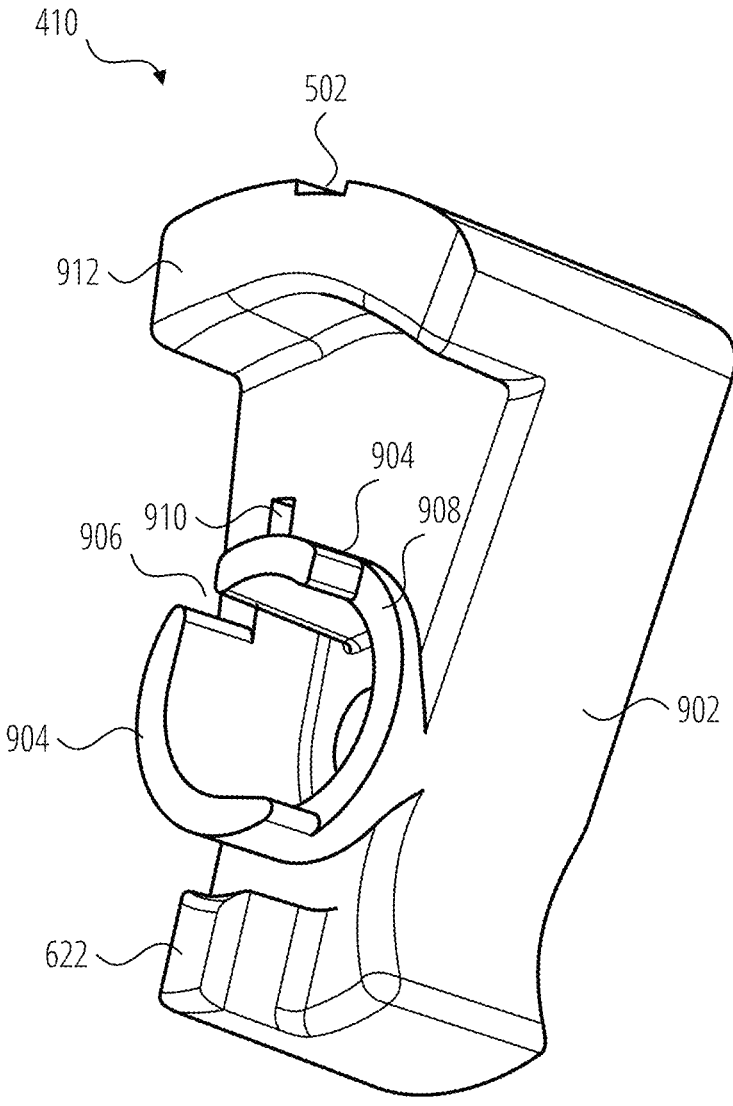
FIG. 9 is a perspective view of the latch handle, looking towards an inner side of the latch handle that faces the body of the coupler when assembled, according to some examples.

FIG. 9 is a perspective view of the latch handle 410, looking towards an inner side of the latch handle 410 that faces the body 602 of the coupler 208 when assembled, according to some examples. The latch handle 410 includes a body 902 having a partial sleeve 904 formed thereon, the outer surface of which engages an inner surface of the cover 604 to hold it in place on the latch handle 410. The sleeve has a slot 906 defined therein that permits the straight end 820 of the torsion spring 802 to be received and held in place in a groove 910 in the body 902 of the latch handle 410. The sleeve 904 also has a cutaway 908 defined therein that accommodates the bent end 818 of the torsion spring 802 during movement of the latch handle 410 between the stops 624, 702.

The latch handle 410 also includes an overhang 912, which improves the appearance of the coupler 208. The overhang 912 also provides a surface on which part of the alignment line 502 can be provided, to enhance the visual effect of alignment or misalignment of the alignment lines 418 on the arms 204 with the alignment lines 502 on the corresponding latch handles 410.

Figure 10A:
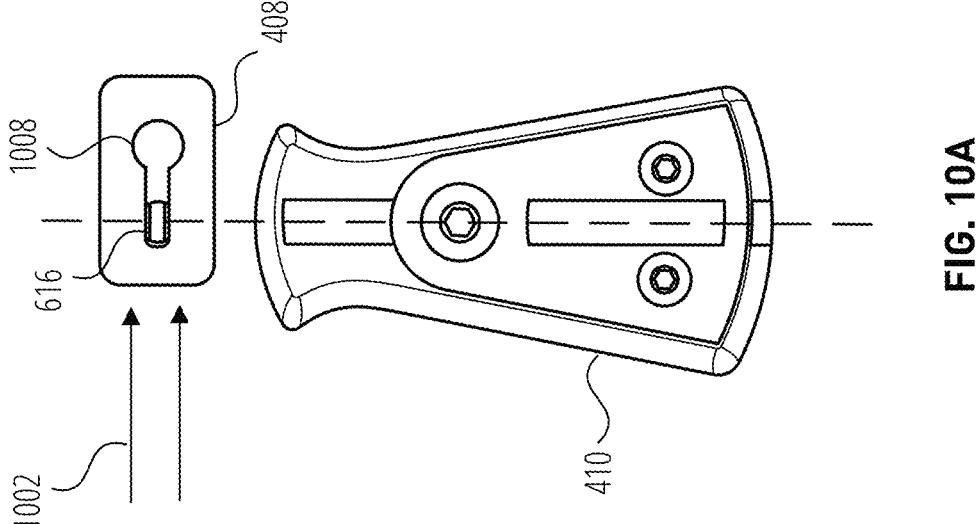

FIG. 10A and FIG. 10B are two side views of the latch 406 and plunger 408 to illustrate the interaction between the latch key 606 and the plunger 408, in some examples. FIG. 10A shows the latch 406 in its open position in which the corresponding arm 204 is folded as shown in FIG. 3 and FIG. 4. In this position, the plunger 408 extends (to the right in FIG. 10A) from the body 602 of the fixed portion 416 under a spring bias 1002 applied by the plunger springs 608. The flat surfaces 616 of the latch key 606 are held in the narrower portion 1006 of the keyhole-shaped slot 610 in the plunger 408. The latch 406 is thus held in this open position by the plunger 408 and it cannot be rotated into a closed position by the bias applied by the torsion spring 802, or manually by a user, without the plunger 408 being depressed.

FIG. 10B shows the latch 406 in its fully-closed position after its corresponding arm 204 has been rotated into its extended position. In this position, the plunger 408 has been depressed (moved to the left in FIG. 10B) into the body 602 of the fixed portion 416 by closing forces 1004 exerted by the movable portion 414 of the coupler 208 when the arm is extended. The slot of the plunger 408 moves to the left while the plunger 408 is being depressed, until the wider portion 1008 of the slot 610 receives the flat surfaces 616 of the latch key 606. At this point, the latch key 606 is no longer held by the slot 806 of the plunger 408. The latch 406 then rotates from the closed position illustrated in FIG. 10A to the partially closed position (see FIG. 5 and FIG. 11B) under the influence of the torsion spring 802. The release of the latch key 606, and thus the latch 406, occurs when the plunger 408 is fully depressed and the arm 204 is fully extended, which ensures that the cam 404 is in a position in which it can be partially engaged by the latch handle 410, as shown in FIG. 5 and FIG. 11B.

At this point, in which the latch 406 partially engages the cam 404 on the movable portion 414 of the coupler 208, the arm 204 is held in its extended position. The pilot then turns the latch 406 into the fully closed position shown in FIG. 10B and FIG. 11C.

When the drone 102 is to be stowed, the pilot turns the latch 406 from the fully-closed position illustrated in FIG. 10B to the open position illustrated in FIG. 10A, against the resistance of the torsion spring 802. As the flat surfaces 616 of the latch key 606 become parallel to the narrower portion 1006 of the slot 610, the plunger moves to the right under the influence of the spring bias 1002 exerted by the plunger springs 608, trapping the latch key 606 in the open position illustrated in FIG. 10A.

The plunger 408 thus forms a lock that holds the latch handle 410 in the release position, the lock being released by depression of the plunger 408.

FIG. 11A, FIG. 11B, and FIG. 11C are three side views of latch 406 that illustrate a locking sequence in some examples. FIG. 11A corresponds to the latch and plunger positions illustrated in FIG. 10A, while FIG. 11C corresponds to the latch and plunger positions illustrated in FIG. 10B.

FIG. 11A shows the position of the latch 406 as the arm 204 approaches the closed position. The latch 406 faces downward, as discussed above. When the arm 204 is fully extended, the latch 406 is released by the plunger 408 and the latch handle 410 rotates from the open position illustrated in FIG. 11A to the partially closed position in FIG.

11B under the influence of the torsion spring 802. The latch 406 now partially engages the cam 404, holding the arm 204 in the extended position. The full extension of the arm 204 has depressed the plunger 408, which has released the spring-loaded latch 406, giving an audible click.

At this point, the latch 406 partially engages the cam 404 that is on the movable portion 414 of the coupler 208, which holds the arm 204 in its extended position. If the pilot fails to rotate the latch 406 to full engagement, the drone 102 is still safe for flight as a partially engaged latch 406 will still prevent arm movement, and the spring-loaded latch handle 410 will only increase its engagement under torque and vibration, due to the continued bias towards the fully-closed position that is applied by the torsion spring 802. The brightly-colored alignment line 502 on the latch 406 is misaligned with the similarly-colored alignment line 418 on the arm 204, providing a visual cue to the pilot that the latch 406 has not been fully engaged.

The pilot then turns the latch 406 into the fully closed position shown in FIG. 11C. In this position, the alignment line 502 on the latch 406 is aligned with the alignment line 418 on the arm 204, providing visual confirmation that the latch 406 has been fully engaged.

Figure 12:
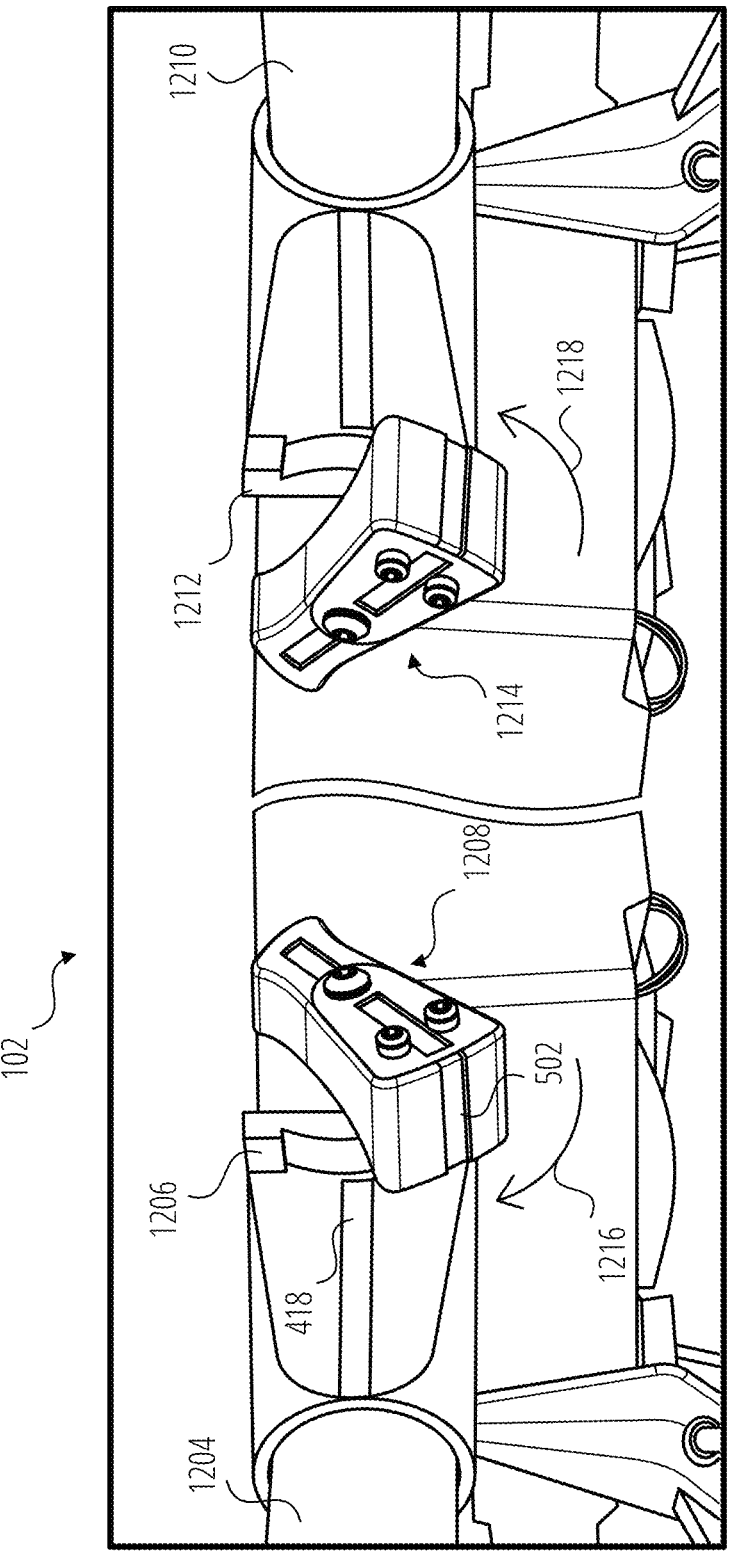
FIG. 12 is a schematic front view showing two halves of the drone 102, to illustrate the rotation of opposed latches.

FIG. 12 is a schematic front view showing two halves of the drone 102, to illustrate the rotation of opposed latches. FIG. 12 is a schematic split view that has been assembled to illustrate rotation of the latches 406, and does not represent the actual appearance of the drone 102. The terms "left" and "right" are used to describe FIG. 12 from the viewer's perspective.

As show, the drone 102 includes a left arm 1204 that is locked into its extended position by means of rotation of a latch 1208 into engagement with a cam 1206 as described above. Rotation of the latch 1208 into engagement with the cam 1206 is outwardly from the center of the drone 102 in an anticlockwise direction 1216. Similarly, the drone 102 includes a right arm 1210 that is locked into its extended position by means of rotation of a latch 1214 into engagement with a cam 1212 as described above. Rotation of the latch 1214 into engagement with the cam 1212 is outwardly from the center of the drone 102 in a clockwise direction 1218.

This provides a consistent and convenient arrangement in which the latches 1214, 1208 are rotated from a downward-facing position outward and upward away from each other into a locked position. The latch 1208 is thus a mirror image of latch 1214, which is described and illustrated in more detail above with specific reference to FIG. 6 and FIG. 7.

A similar arrangement of latches 406 is provided at the rear of the drone 102, with mirror left and right latches, the latch handles 410 of which rotated from a downward-facing position outward and upward away from each other into a locked position.

Various examples are contemplated. Example 1 is a drone, comprising: a body; a first arm rotatably coupled to the body to rotate between an extended position and a retracted position; a first coupling mechanism operable to retain the first arm in its extended position, the first coupling mechanism including a first latch being movable from an engaged position in which the first arm is held in its extended position and a release position in which the first arm is free to move between its extended position and its retracted position, the first latch being biased towards its engaged position; a second arm rotatably coupled to the body to rotate between an extended position and a retracted position; and a second coupling mechanism operable to retain the second arm in its extended position, the second coupling mechanism including a second latch being movable from an engaged position in which the second arm is held in its extended position and a release position in which the second arm is free to move between its extended position and its retracted position, the second latch being biased towards its engaged position.

In Example 2, the subject matter of Example 1 includes, wherein the first coupling mechanism includes a lock that holds the first latch in its release position, the first latch being released from the lock by rotation of the first arm into its extended position.

In Example 3, the subject matter of Example 2 includes, wherein the release of the first latch engages a latch handle with a cam on the first arm to hold the first arm in its extended position.

In Example 4, the subject matter of Example 3 includes, wherein the latch handle is further movable into a position in which the latch handle fully engages the cam.

In Example 5, the subject matter of Example 4 includes, wherein the latch handle includes a visual feature that is aligned with a corresponding visual feature on the first arm when the latch handle fully engages the cam.

In Example 6, the subject matter of Examples 1-5 includes, wherein the first latch is moveable between a partially engaged position in which the first latch retains the first arm in its extended position and a fully engaged position, the first latch including a visual feature that is aligned with a corresponding visual feature on the first arm when the first latch is in the fully engaged position.

In Example 7, the subject matter of Example 6 includes, wherein the first coupling mechanism includes a plunger that holds the first latch in its release position, the plunger being depressed to release the first latch from its release position by rotation of the first arm into its extended position.

In Example 8, the subject matter of Examples 2-7 includes, wherein the lock includes a plunger that holds the first latch in its release position, the plunger being depressed to release the first latch from its release position by rotation of the first arm into its extended position.

In Example 9, the subject matter of Examples 2-8 includes, wherein the first latch includes a first latch handle and the second latch includes a second latch handle, the first latch handle and the second latch handle rotating away from each other when the first and second latches are moved from their respective release positions into their respective engaged positions.

In Example 10, the subject matter of Example 9 includes, wherein the first latch handle includes a visual feature that is aligned with a corresponding visual feature on the first arm when the first latch handle is rotated into a fully engaged position, and the second latch handle includes a visual feature that is aligned with a corresponding visual feature on the second arm when the second latch handle is rotated into a fully engaged position.

Example 11 is a coupling mechanism for a drone, comprising: a fixed portion for coupling to a drone; a movable portion rotatably coupled to the fixed portion and being movable between an extended position and a retracted position, the movable portion being configured to receive an arm of a drone; and a coupling mechanism operable to retain the movable portion in its extended position, the coupling mechanism including a latch being movable from an engaged position in which the movable portion is held in its extended position and a release position in which the movable portion is free to move between its extended position and its retracted position, the latch being biased towards its engaged position.

In Example 12, the subject matter of Example 11 includes, wherein the coupling mechanism includes a lock that holds the latch in its release position, the latch being released from the lock by rotation of the movable portion into its extended position.

In Example 13, the subject matter of Example 12 includes, wherein the release of the latch engages a latch handle with a cam on the movable portion to hold the movable portion in its extended position.

In Example 14, the subject matter of Example 13 includes, wherein the latch handle is further movable into a position in which the latch handle fully engages the cam.

In Example 15, the subject matter of Example 14 includes, wherein the latch handle includes a visual feature that is aligned with a corresponding visual feature on the arm when the latch handle fully engages the cam.

Example 16 is a drone, comprising: a body; an arm rotatably coupled to the body to rotate between an extended position and a retracted position; a coupling mechanism operable to retain the arm in its extended position, the coupling mechanism including a latch being movable from an engaged position in which the arm is held in its extended position and a release position in which the arm is free to move between its extended position and its retracted position, the latch being biased towards its engaged position.

In Example 17, the subject matter of Example 16 includes, wherein the latch includes a visual feature that is aligned with a corresponding visual feature on the arm when the latch is fully engaged.

In Example 18, the subject matter of Examples 16-17 includes, wherein the coupling mechanism includes a lock that holds the latch in its release position, the latch being released from the lock by rotation of the arm into its extended position.

In Example 19, the subject matter of Examples 17-18 includes, wherein the coupling mechanism includes a lock that holds the latch in its release position, the latch being released from the lock by rotation of the arm into its extended position.

In Example 20, the subject matter of Examples 18-19 includes, wherein the release of the latch engages a latch handle with a cam to hold the arm in its extended position.

Example 21 is an apparatus comprising means to implement of any of Examples 1-20. Example 22 is a system to implement of any of Examples 1-20. Example 23 is a method to implement of any of Examples 1-20.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A drone, comprising:

a body;

a first arm rotatably coupled to the body to rotate between an extended position and a retracted position;

a first coupling mechanism operable to retain the first arm in its extended position, the first coupling mechanism including a first latch being movable from an engaged position in which the first arm is held in its extended position and a release position in which the first arm is free to move between its extended position and its retracted position, the first latch being biased towards its engaged position;

a second arm rotatably coupled to the body to rotate between an extended position and a retracted position; and a second coupling mechanism operable to retain the second arm in its extended position, the second coupling mechanism including a second latch being movable from an engaged position in which the second arm is held in its extended position and a release position in which the second arm is free to move between its extended position and its retracted position, the second latch being biased towards its engaged position, wherein the first coupling mechanism includes a lock that holds the first latch in its release position, the first latch being released from the lock by rotation of the first arm into its extended position, wherein the release of the first latch engages a latch handle with a cam on the first arm to hold the first arm in its extended position, wherein the latch handle is further movable into a position in which the latch handle fully engages the cam, and wherein the latch handle includes a visual feature that is aligned with a corresponding visual feature on the first arm when the latch handle fully engages the cam.

2. A drone, comprising:

a body:

a first arm rotatably coupled to the body to rotate between an extended position and a retracted position:

a first coupling mechanism operable to retain the first arm in its extended position, the first coupling mechanism including a first latch being movable from an engaged position in which the first arm is held in its extended position and a release position in which the first arm is free to move between its extended position and its retracted position, the first latch being biased towards its engaged position;

a second arm rotatably coupled to the body to rotate between an extended position and a retracted position; and a second coupling mechanism operable to retain the second arm in its extended position, the second coupling mechanism including a second latch being movable from an engaged position in which the second arm is held in its extended position and a release position in which the second arm is free to move between its extended position and its retracted position, the second latch being biased towards its engaged position, and wherein the first latch is moveable between a partially engaged position in which the first latch retains the first arm in its extended position and a fully engaged position, the first latch including a visual feature that is aligned with a corresponding visual feature on the first arm when the first latch is in the fully engaged position.

3. The drone of claim 2, wherein the first coupling mechanism includes a plunger that holds the first latch in its release position, the plunger being depressed to release the first latch from its release position by rotation of the first arm into its extended position.

4. The drone of claim 1, wherein the lock includes a plunger that holds the first latch in its release position, the plunger being depressed to release the first latch from its release position by rotation of the first arm into its extended position.

5. A drone, comprising:

a body:

a first arm rotatably coupled to the body to rotate between an extended position and a retracted position;

a first coupling mechanism operable to retain the first arm in its extended position, the first coupling mechanism including a first latch being movable from an engaged position in which the first arm is held in its extended position and a release position in which the first arm is free to move between its extended position and its retracted position, the first latch being biased towards its engaged position;

a second arm rotatably coupled to the body to rotate between an extended position and a retracted position; and a second coupling mechanism operable to retain the second arm in its extended position, the second coupling mechanism including a second latch being movable from an engaged position in which the second arm is held in its extended position and a release position in which the second arm is free to move between its extended position and its retracted position, the second latch being biased towards its engaged position, wherein the first coupling mechanism includes a lock that holds the first latch in its release position, the first latch being released from the lock by rotation of the first arm into its extended position, wherein the first latch includes a first latch handle and the second latch includes a second latch handle, the first latch handle and the second latch handle rotating away from each other when the first and second latches are moved from their respective release positions into their respective engaged positions, and wherein the first latch handle includes a visual feature that is aligned with a corresponding visual feature on the first arm when the first latch handle is rotated into a fully engaged position, and the second latch handle includes a visual feature that is aligned with a corresponding visual feature on the second arm when the second latch handle is rotated into a fully engaged position.

6. A coupling mechanism for a drone, comprising:

a fixed portion for coupling to the drone;

a movable portion rotatably coupled to the fixed portion and being movable between an extended position and a retracted position, the movable portion being configured to receive an arm of the drone; and a coupling mechanism operable to retain the movable portion in its extended position, the coupling mechanism including a latch being movable from an engaged position in which the movable portion is held in its extended position and a release position in which the movable portion is free to move between its extended position and its retracted position, the latch being biased towards its engaged position, wherein the coupling mechanism includes a lock that holds the latch in its release position, the latch being released from the lock by rotation of the movable portion into its extended position, wherein the release of the latch engages a latch handle with a cam on the movable portion to hold the movable portion in its extended position, wherein the latch handle is further movable into a position in which the latch handle fully engages the cam, and wherein the latch handle includes a visual feature that is aligned with a corresponding visual feature on the arm when the latch handle fully engages the cam.

7. A drone, comprising:

a body;

an arm rotatably coupled to the body to rotate between an extended position and a retracted position; and a coupling mechanism operable to retain the arm in its extended position, the coupling mechanism including a latch being movable from an engaged position in which the arm is held in its extended position and a release position in which the arm is free to move between its extended position and its retracted position, the latch being biased towards its engaged position, wherein the latch includes a visual feature that is aligned with a corresponding visual feature on the arm when the latch is fully engaged.

8. The drone of claim 7, wherein the coupling mechanism includes a lock that holds the latch in its release position, the latch being released from the lock by rotation of the arm into its extended position.

9. The drone of claim 8, wherein the release of the latch engages a latch handle with a cam on to hold the arm in its extended position.

10. The drone of claim 7, wherein the coupling mechanism includes a lock that holds the latch in its release position, the latch being released from the lock by rotation of the arm into its extended position.

* * * * *